(12) United States Patent
Ortet et al.

(10) Patent No.: US 11,967,900 B2
(45) Date of Patent: Apr. 23, 2024

(54) VOLTAGE CONVERTER AND METHOD

(71) Applicant: STMicroelectronics (Rousset) SAS, Rousset (FR)

(72) Inventors: Sebastien Ortet, Chateauneuf-le-Rouge (FR); Olivier Lauzier, La Bouilladisse (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/366,353

(22) Filed: Jul. 2, 2021

(65) Prior Publication Data

US 2022/0038001 A1 Feb. 3, 2022

(30) Foreign Application Priority Data

Jul. 30, 2020 (FR) ...................................... 2008090

(51) Int. Cl.
*H02M 3/158* (2006.01)
*H02M 1/00* (2006.01)
*H02M 1/36* (2007.01)

(52) U.S. Cl.
CPC ......... *H02M 3/158* (2013.01); *H02M 1/0032* (2021.05); *H02M 1/0083* (2021.05); *H02M 1/36* (2013.01)

(58) Field of Classification Search
CPC .. H02M 3/158; H02M 1/0032; H02M 1/0083; H02M 1/36
See application file for complete search history.

(56) References Cited

U.S. PATENT DOCUMENTS

| | | | |
|---|---|---|---|
| 8,710,810 B1* | 4/2014 | McJimsey | H02M 3/158 323/283 |
| 2007/0164720 A1* | 7/2007 | Lalithambika | H02M 3/156 323/288 |
| 2012/0026766 A1 | 2/2012 | Adragna | |
| 2012/0038331 A1 | 2/2012 | Wu et al. | |
| 2013/0063106 A1 | 3/2013 | Nishida et al. | |
| 2014/0145698 A1* | 5/2014 | Saito | H02M 1/32 323/285 |
| 2015/0137776 A1* | 5/2015 | Thomas | H02M 3/1588 323/271 |
| 2018/0337599 A1 | 11/2018 | Chen et al. | |
| 2019/0267897 A1 | 8/2019 | Hsieh | |
| 2020/0091822 A1 | 3/2020 | Ou et al. | |

FOREIGN PATENT DOCUMENTS

| | | |
|---|---|---|
| CN | 101459381 A | 6/2009 |
| CN | 111092538 A | 5/2020 |

* cited by examiner

*Primary Examiner* — Jue Zhang
*Assistant Examiner* — Afework S Demisse
(74) *Attorney, Agent, or Firm* — Slater Matsil, LLP

(57) ABSTRACT

An embodiment voltage converter includes a first transistor connected between a first node of the converter and a second node configured to receive a power supply voltage, a second transistor connected between the first node and a third node configured to receive a reference potential, a first circuit configured to control the first and second transistors, and a comparator including first and second inputs. The first input is configured to receive, during a first phase, a first voltage ramp and, during a second phase, a set point voltage. The second input is configured to receive, during the first phase, the set point voltage and, during the second phase, a second voltage ramp.

22 Claims, 4 Drawing Sheets

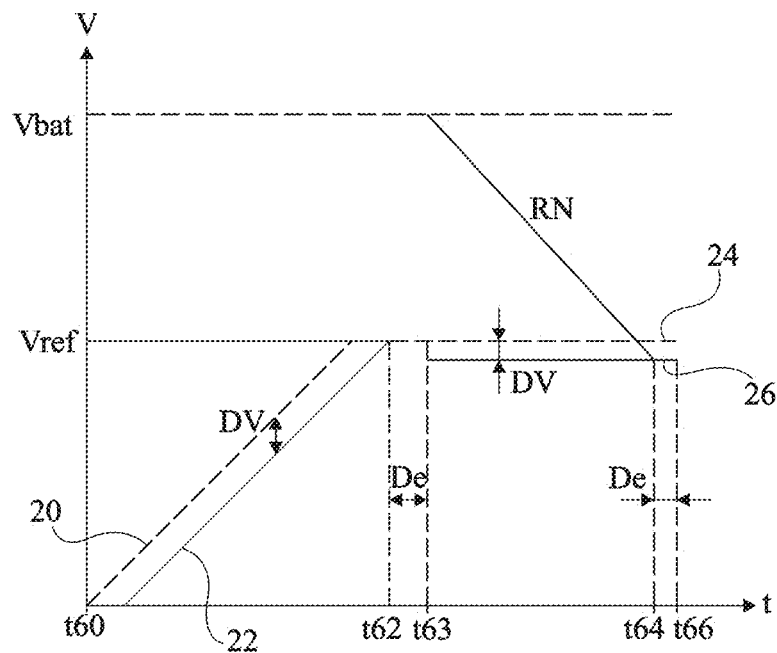
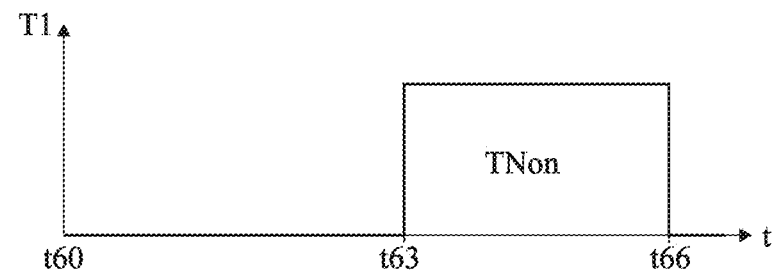
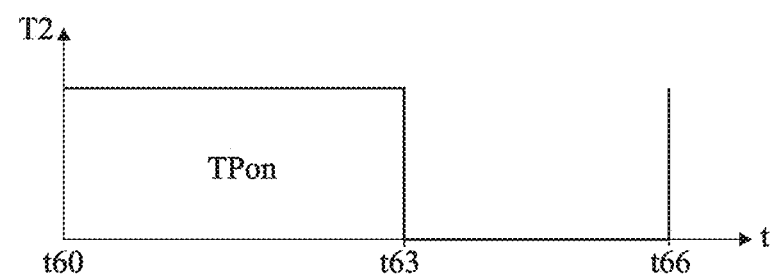
Fig 5

VOLTAGE CONVERTER AND METHOD

CROSS-REFERENCE TO RELATED APPLICATIONS

This application claims the benefit of French Application No. 2008090, filed on Jul. 30, 2020, which application is hereby incorporated herein by reference.

TECHNICAL FIELD

The present disclosure generally concerns electronic circuits. It more particularly concerns DC/DC voltage converters, of switched-mode power supply type, which convert a DC power supply voltage into a DC output voltage, for example buck-type DC/DC voltage converters where the DC output voltage has a lower value than the DC power supply voltage.

BACKGROUND

In a switched-mode power converter, a direct current (DC) voltage for powering the converter is chopped by the switching of switches to implement phases of power storage in an assembly comprising an inductive element and a capacitive element and phases of delivery, to a load connected to the converter output, of the power stored in the assembly.

In a pulse frequency modulation (PFM)-type switched-mode converter, each operating cycle of the converter comprises a phase of power storage in the assembly, followed by a phase of power delivery to the load connected to the converter. During the power storage phase, the current flowing through the inductive element increases. During the power delivery phase, the current flowing through the inductive element decreases. For each operating cycle, it is desirable for the current flowing through the inductive element to be null at the beginning of the power storage phase and at the end of the power delivery phase.

Known switched-mode converters, particularly of PFM type, have various disadvantages.

SUMMARY

There is a need to overcome all or part of the disadvantages of known switched-mode converters, particularly of PFM type.

An embodiment overcomes all or part of the disadvantages of known switched-mode converters, particularly of PFM type.

An embodiment voltage converter comprises a first transistor connected between a first node of the converter and a second node configured to receive a power supply voltage; a second transistor connected between the first node and a third node configured to receive a reference potential; a first circuit configured to control the first and second transistors; and a comparator comprising first and second inputs, the first input being configured to receive, during a first phase, a first voltage ramp and, during a second phase, a set point voltage, and the second input being configured to receive, during the first phase, the set point voltage and, during the second phase, a second voltage ramp.

An embodiment method of controlling a voltage converter comprises a first transistor connected between a first node of the converter and a second node configured to receive a power supply voltage; a second transistor connected between the first node and a third node configured to receive a reference potential; and a first circuit configured to control the first and second transistors; and a comparator comprising first and second inputs, the method comprising: a first phase during which the first input receives a first voltage ramp and the second input receives a set point voltage, and a second phase during which the first input receives the set point voltage and the second input receives a second voltage ramp.

According to an embodiment, the first input is a non-inverting input and the second input is an inverting input.

According to an embodiment, the first and second inputs are respectively coupled to first and second outputs of a selection element receiving at its inputs the set point voltage and the first and second voltage ramps.

According to an embodiment, the device comprises an operating mode comprising a plurality of operating cycles, each operating cycle comprising a first phase and a second phase.

According to an embodiment, the first voltage ramp is a rising ramp and the second voltage ramp is a falling ramp.

According to an embodiment, the first and second voltage ramps have a same slope in absolute value.

According to an embodiment, an output of the comparator is coupled to the first circuit.

According to an embodiment, the comparator is configured to output an output signal, the signal taking a first value when the second voltage ramp reaches the value of the set point voltage, and taking a second value when the first voltage ramp reaches the value of the set point voltage.

According to an embodiment, the first circuit is configured to maintain the first and second transistors respectively on and off during the first phase and to maintain the first and second transistors respectively off and on during the second phase.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 5 shows timing diagrams illustrating the operation of the embodiment of FIG. 4.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
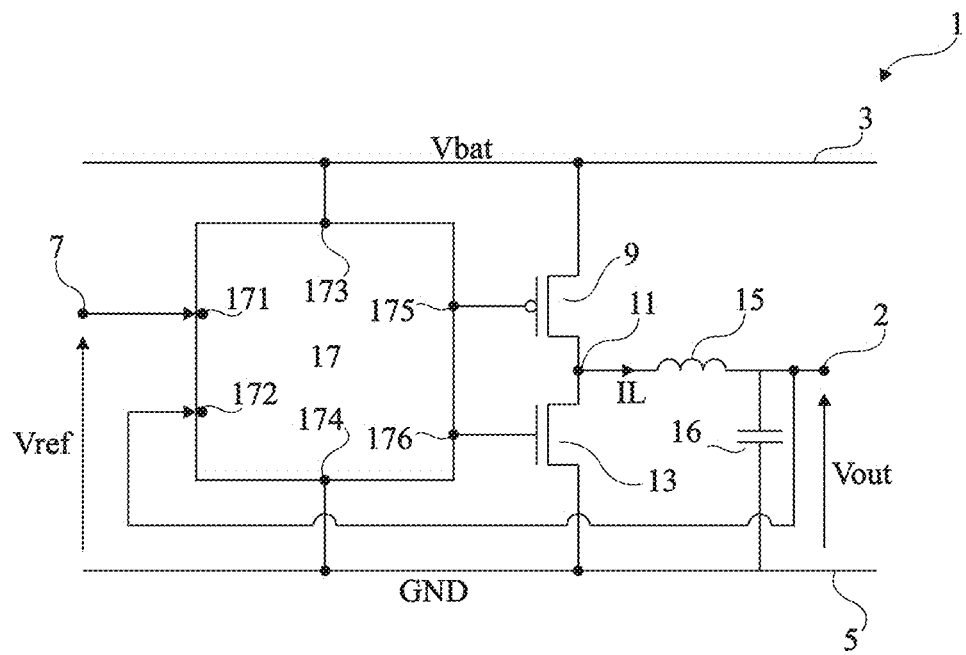
FIG. 1 schematically shows an embodiment of a DC/DC voltage converter.

FIG. 1 schematically shows an example of a voltage converter 1 of the type to which the described embodiments apply. In this example, converter 1 is a DC/DC converter, which converts a DC power supply voltage into a DC output voltage.

Converter 1 is configured to deliver a DC output voltage Vout. The converter comprises an output node 2, where voltage Vout is available.

Converter 1 is powered with a DC power supply voltage Vbat. Converter 1 is then connected between a first conductive rail or node 3 set to voltage Vbat and a second conductive rail or node 5 set to a reference potential GND.

Converter 1 is configured to deliver voltage Vout at a value equal to a set point value. For this purpose, converter 1 receives, on an input node 7, a DC set point voltage Vref referenced to potential GND, having a value representative of the set point value of voltage Vout, preferably equal to the set point value of voltage Vout.

In this example, voltages Vout, Vbat, and Vref are positive. In this example, voltages Vout, Vbat, and Vref are referenced to potential GND, for example, the ground.

In this example, converter 1 is of buck type, that is, the set point value of voltage Vout is smaller than the value of voltage Vbat. In other words, the value of voltage Vout is smaller than that of voltage Vbat.

Converter 1 comprises a first MOS ("metal oxide semiconductor") transistor 9, preferably a PMOS transistor (P-channel MOS transistor). MOS transistor 9 is coupled, preferably connected, between rail 3 and an internal node 11. In other words, a first conduction terminal of transistor 9, for example, its source, is coupled, preferably connected, to rail 3, a second conduction terminal of transistor 9, for example, its drain, being coupled, preferably connected, to node 11.

Converter 1 further comprises a second MOS transistor 13, preferably an NMOS transistor (N-channel MOS transistor). Transistor 13 is coupled, preferably connected, between node 11 and rail 5. In other words, a first conduction terminal of transistor 13, for example, its source, is coupled, preferably connected, to rail 5, a second conduction terminal of transistor 13, for example, its drain, being coupled, preferably connected, to node 11. As a variant, the NMOS transistor may be replaced with a diode or a Schottky diode.

Thus, transistors 9 and 13 are series-connected between rails 3 and 5 and are connected to each other at the level of internal node 11.

Converter 1 comprises an inductive element or inductance 15. Inductance 15 is connected between node 11 and node 2. Converter 1 comprises a capacitive element or output capacitor 16 connected between node 2 and rail 5. As an example, the capacitance of the capacitive element is greater than 2 µF, preferably in the range from 2.2 µF to 20 µF, or even more. The output capacitor plays the role of a filter. In other words, the converter output capacitor enables to smooth the current present on node 2 and to store power supplied to node 2 by the converter.

Converter 1 comprises a control circuit 17. Circuit 17 is configured to implement, or control, the operating cycles of converter 1, in order to regulate voltage Vout so that its value is equal to set point value Vref.

For this purpose, circuit 17 comprises:
a terminal 171 coupled, preferably connected, to node 7;
a terminal 172 coupled, preferably connected, to node 2;
a terminal 173 coupled, preferably connected, to rail 3;
a terminal 174 coupled, preferably connected, to rail 5;
a terminal 175 coupled, preferably connected, to a control terminal, or gate, of transistor 9; and
a terminal 176 coupled, preferably connected, to a control terminal, or gate, of transistor 13.

In operation, a load is connected between node 2 and rail 5 to be powered with voltage Vout. The load for example comprises an input capacitor between node 2 and rail 5.

In this example, converter 1 is configured to operate in pulse frequency modulation (discontinuous conduction mode). Circuit 17 is then configured to start an operating cycle of converter 1 when the value of voltage Vout is smaller than set point value Vref and the two transistors 9 and 13 are in the off state. More particularly, at the beginning of each operating cycle, circuit 17 is configured to control transistor 9 to the on state, transistor 13 being left in the off state. Power is then stored in inductance 15 and in capacitor 16, during a first time period TPon, for example constant for each operating cycle when transistor 9 is maintained in the on state by circuit 17, a current IL then flowing through inductance 15. At the end of time period TPon, circuit 17 is configured to control the setting to the off state of transistor 9 and the setting to the on state of transistor 13. Power is then delivered back by inductance 15 and capacitor 16 to the load connected at the converter output, for a second time period TNon, for example constant for each operating cycle when transistor 13 is maintained in the on state by circuit 17, the current IL in the inductance decreasing. At the end of time period TNon, circuit 17 is configured to control the setting to the off state of transistor 13.

Ideally, it is desired for time period TNon to be determined so that the time when circuit 17 controls the setting to the off state of transistor 13, that is, for example, the end of an operating cycle, corresponds to the time when current IL flowing through inductance 15 becomes null. However, in practice, as will be described in further detail in the rest of the disclosure, this is not always true, which raises an issue.

Figure 2:
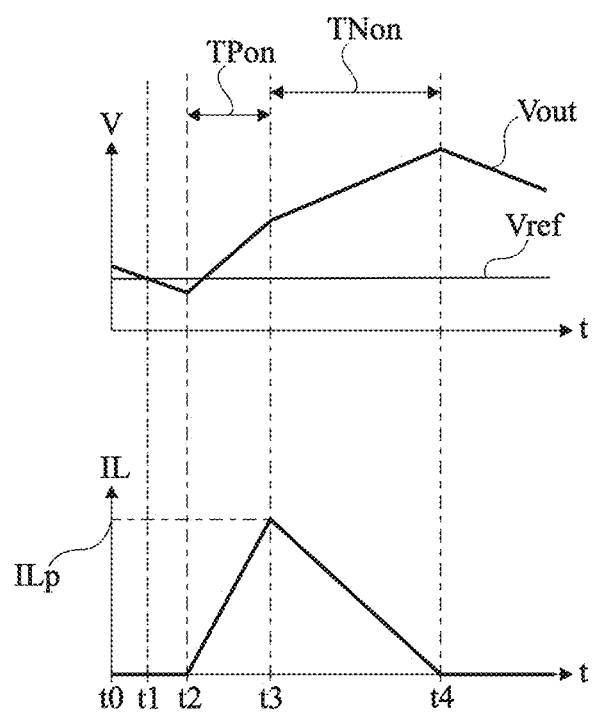
FIG. 2 shows timing diagrams illustrating an example of operation of the converter of FIG. 1.

FIG. 2 shows timing diagrams illustrating an example of desired operation of the converter 1 of FIG. 1.

The timing diagram at the top of FIG. 2 illustrates the variation over time t of voltage Vout, in volts V, the timing diagram at the bottom of FIG. 2 illustrating the corresponding variation, over time t, of the current IL flowing through inductance 15.

At a time t0, transistors 9 and 13 are in the off state, current IL is null, and the value of voltage Vout is greater than its set point value, in the present example the value of voltage Vref.

Between time t0 and a subsequent time t2, voltage Vout decreases, for example due to the fact that the load connected to converter 1 consumes current and discharges the output capacitor.

At a time t1 between times t0 and t2, voltage Vout becomes smaller than its set point value Vref. This is detected by the circuit 17 of converter 1, which then controls the setting to the on state of transistor 9. Transistor 9 turns on at time t2.

Thus, from time t2, inductance 15 has a terminal connected to node 2 and a terminal coupled to rail 3, via transistor 9. The current IL flowing through inductance 15 increases.

As a result, from time t2, current IL is delivered to node 2, and the capacitor 16 between node 2 and rail 5 charges. Voltage Vout increases and becomes greater than its set point value Vref.

At a next time t3, equal to t2+TPon, circuit 17 controls transistor 13 to the on stat and transistor 9 to the off state. At time t3, the current in the inductance has a maximum value ILp.

Thus, from time t3, inductance 15 has a terminal connected to node 2 and a terminal coupled to rail 5, via transistor 13. The current IL flowing through inductance 15 decreases.

Although current IL decreases from time t3, the capacitor between node 2 and rail 5 keeps on charging and voltage Vout keeps on increasing if the current drawn by the load is smaller than the current IL supplied to node 2.

At a next time t4, equal to t3+TNon, circuit 17 controls the setting to the off state of transistor 13. It is here considered that converter 1 operates as it should, and current IL is then null at time t4. However, in practice, this is not always true.

From time t4, current IL is null and voltage Vout decreases, similarly to what would happen at time to.

Although this is not shown herein, when the value of potential Vout falls back below its set point value Vref at a time subsequent to time t4, circuit 17 implements a new operating cycle such as described in relation with successive times t2, t3, and t4.

Figure 3:
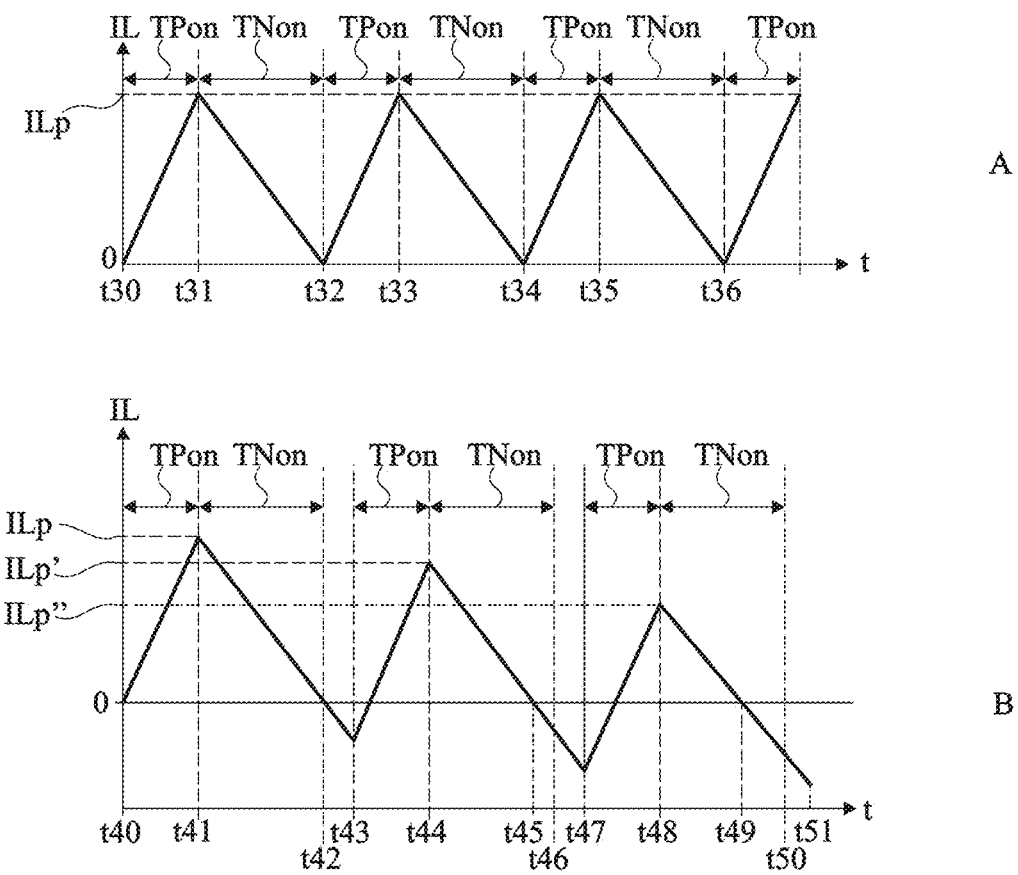
FIG. 3 shows other timing diagrams illustrating the desired or theoretical operation and the real or practical operation of the converter of FIG. 1.

FIG. 3 shows other timing diagrams illustrating the operation of the converter 1 of FIG. 1. More particularly, a timing diagram A (at the top of FIG. 3) shows an ideal or theoretical example of the variation of current IL and a timing diagram B (at the bottom of FIG. 3) shows an example of the real variation of current IL. The two timing diagrams A and B illustrate an example of operation where, for a plurality of successive operating cycles, voltage Vout is smaller than voltage Vref at the end of each operating cycle of converter 1.

At a time t30 (FIG. 3A), although this is not illustrated in FIG. 3, voltage Vout is smaller than voltage Vref. An operating cycle starts with the switching to the on state of transistor 9. As a result, current IL increases until a next time t31 equal to t30+TPon.

At time t31, current IL reaches its maximum value ILp. Further, transistor 9 and 13 are respectively switched to the off state and to the on state. As a result, the current decreases until a next time t32 equal to t31+TNon.

In this example of ideal operation, transistor 13 is switched to the off state at time t32, and current IL becomes null at time t32.

At a time t32, voltage Vout being smaller than voltage Vref, transistor 9 is switched to the on state, which marks the beginning of a new operating cycle. Current IL then increases until a next time t33 equal to t32+TPon.

At time t33, current IL reaches value ILp. Further, transistor 9 and 13 are respectively switched to the off state and to the on state. As a result, the current decreases until a next time t34 equal to t33+TNon.

In this example of ideal operation, transistor 13 is switched to the off state at time t34, and current IL becomes null at time t34.

At a time t34, voltage Vout being smaller to voltage Vref, transistor 13 is switched to the on state, which marks the beginning of a new operating cycle. Current IL increases until a next time t35 equal to t34+TPon.

At time t35, current IL reaches value ILp. Further, transistor 9 and 13 are respectively switched to the off state and to the on state. As a result, the current decreases until a next time t36 equal to t35+TNon.

In this example of ideal operation, transistor 13 is switched to the off state at time t36 and current IL becomes null at time t36.

At time t36, voltage Vout being smaller than voltage Vref, a new operating cycle starts.

In the example of theoretical operation illustrated by timing diagram A, at the end of each operating cycle, the switching of transistor 13 to the off state occurs at the time when current IL becomes null. Thus, when an operating cycle is immediately followed by a new operating cycle, in this new operating cycle, current IL increases from a null value.

Timing diagram B illustrates a corresponding example of real operation of converter 1. In this example of real operation, the practically case where transistor 13 is not immediately switched to the off state at the end of the time period TNon which has elapsed from its last switching to the on state is considered.

At a time t40 (FIG. 3B), voltage Vout being smaller than voltage Vref, an operating cycle starts with the switching to the on state of transistor 9. As a result, current IL increases until a next time t41 equal to t40+TPon.

At time t41, current IL reaches its maximum value ILp. Further, transistors 9 and 13 are respectively switched to the off state and to the on state. As a result, the current decreases until a next time t42 equal to t41+TNon. The current becomes null at time t42. However, the switching of transistor 13 to the off state is only effective at a time t43 subsequent to time t42. Thus, between times t42 and t43, current IL is negative and decreases. In other words, the current flows through inductance 15 from node 11 to node 2 before time t42, becomes null at time t42, and flows through inductance 15, from node 2 to node 11 after time t42.

At a time t43, voltage Vout being smaller than voltage Vref, transistor 9 is switched to the on state at time t43, which marks the beginning of a new operating cycle. Current IL then increases until a next time t44 equal to t43+TPon.

At time t44, current IL reaches a value ILp', smaller than maximum value ILp due to the fact that time period TPon is constant at each cycle. Further, transistor 9 and 13 are respectively switched to the off state and to the on state. As a result, current IL decreases until a next time t46 equal to t44+TNon, current IL becoming null at a time t45 between times t44 and t46. Further, the switching of transistor 13 to the off state is only effective at a time t47 subsequent to time t46. Thus, between times t45 and t47, current IL is negative and decreases to a value lower (or higher in absolute value) than that reached at time t43.

At time t47, voltage Vout being smaller than voltage Vref, transistor 9 is switched to the on state at time t47, which marks the beginning of a new operating cycle. Current IL then increases until a next time t48 equal to t47+TPon.

At time t48, current IL reaches a value ILp", smaller than value ILp'. Further, transistor 9 and 13 are respectively switched to the off state and to the on state. As a result, current IL decreases until a next time t50 equal to t48+TNon, current IL becoming null at a time t49 between times t48 and t50. Further, the switching of transistor 13 to the off state is only effective at a time t51 subsequent to time t50. Thus, between times t49 and t51, current IL is negative and decreases to a value lower (or higher in absolute value) than that reached at time t47.

Due to the fact that at each operating cycle illustrated by timing diagram B, the maximum value reached by current IL (times t41, t44, and t48) is lower and lower, converter 1 does not supply enough power to node 2 to regulate voltage Vout to its value Vref, voltage Vout being for example lower and lower, which raises an issue. Further, at each operating cycle illustrated by timing diagram B, the negative value reached by current IL (times t43, t47, and t51) is lower and lower (or higher and higher in absolute value), whereby converter 1 samples more and more power from node 2, which is not desirable. Indeed, the value of the current supplied to the load, and in particular the value of the current peak, decreases from one cycle to the other, which has a negative impact on the load power supply. Further, although, theoretically, the maximum value of current IL might infinitely decrease, in practice, transistor 13 may in certain cases be destroyed or damaged before this by negative values of the current IL that transistor 13 is not capable of conducting between its conduction terminals.

A practical example of operation where the switching to the off state of transistor 13 occurs after the time when current IL becomes null has been described in relation with the timing diagram B of FIG. 3.

In another practical example of operation, not illustrated, at each operating cycle of a plurality of successive cycles implemented immediately one after the others, transistor 13 is switched to the off state while current IL is not null and is still positive. In this case, at each of the operating cycles, current IL increases from a higher and higher value, whereby current IL reaches a higher and higher maximum value, and the operating cycle ends with a higher and higher positive non-null value of current IL. This operation is less disturbing than that described in relation with timing diagram B since, after a plurality of operating cycles, voltage Vout will have recovered its set point value Vref. Thus, the next operating cycle will not be immediately implemented, which will leave time for current IL to become null.

Both cases, that is, the case described in relation with the timing diagram B of FIG. 3 and the other above-described practical case, are generally at least partly caused by imperfections in comparators of circuit 17.

Figure 4:
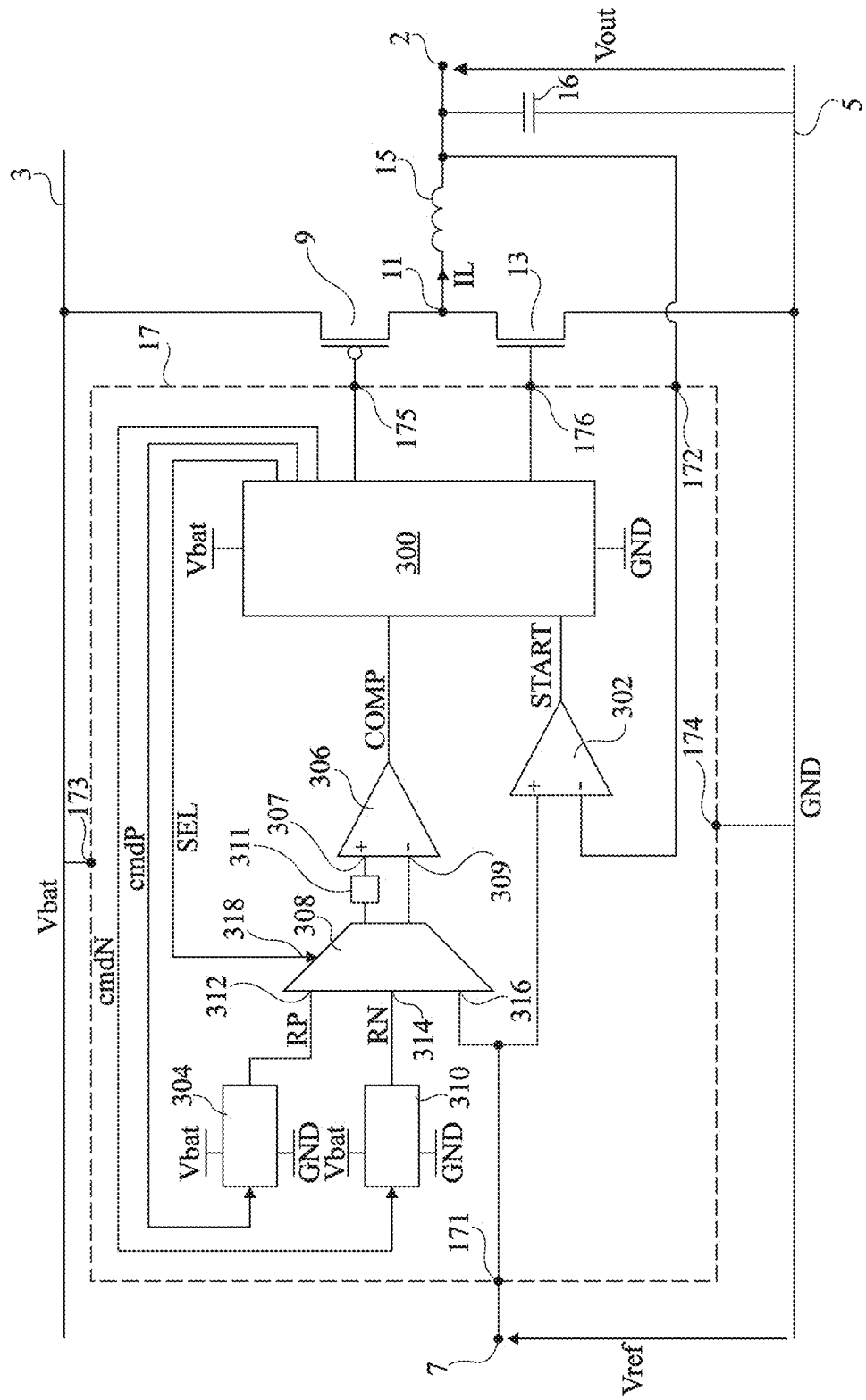
FIG. 4 shows an embodiment of a voltage converter.

FIG. 4 shows an embodiment of a voltage converter. The converter of FIG. 4 comprises the elements described in relation with FIG. 1, circuit 17 being more detailed.

Circuit 17 comprises a circuit 300, for example, a state machine. State machine 300 is configured to supply the control signals of transistors 9 and 13 to respective terminals 175 and 176. To determine the control signals of transistors 9 and 13, state machine 300 receives a plurality of signals. Circuit 300 is powered with voltage Vbat and is connected between rails 3 and 5.

Circuit 17 comprises a comparator 302 configured to deliver, on its output, a signal START representative of the comparison of the value of voltage Vout with its set point value. The output of comparator 302 is coupled, for example, connected, to circuit 300. Signal START is in a first state, for example, a high state, when the value of voltage Vout is smaller than its set point value, and in a second state, for example, a low state, when the value of voltage Vout is greater than its set point value. Comparator 302 comprises a first input, for example, inverting (−), configured to receive a voltage having a value representative of the value of voltage Vout and a second input, for example, non-inverting (+) configured to receive a voltage having a value representative of the set point value of voltage Vout.

In this example where the value of voltage Vref is equal to the set point value of voltage Vout, comparator 302 is configured to compare voltage Vref with voltage Vout, the first input of comparator 302 being connected to node 2, and the second input of comparator 302 being connected to terminal 171 of circuit 17.

Circuit 17 comprises a comparator 306 configured to output a signal COMP representative of the comparison between the set point voltage and a voltage ramp. The output of comparator 306 is coupled, preferably connected, to circuit 300.

Comparator 306 comprises an input 307 and an input 309. Input 307 is a non-inverting input (+) and input 309 is an inverting input (−).

The comparators, and in particular comparator 306, have, due to manufacturing variations, an offset in the comparison values. More particularly, when comparator 308 receives voltages S1 and S2 as inputs, the result output by comparator 306 corresponds to the result of the comparison between voltage S1 and voltage S2+DV, DV being the offset value. Value DV is a positive or negative voltage value. In the example of FIG. 4, comparator 308 is associated with a circuit 311 configured to represent the offset of comparator 306. Comparator 306 is thus considered as having no offset.

Circuit 311 preferably does not exist in reality and is a representation of a characteristic of the comparator. In practice, the input of circuit 311 corresponds to input 307 of the comparator.

Input 307 is coupled, preferably connected, to the output of circuit 311 configured to correct the offset of comparator 306. Circuit 311 is configured, in this example to add a voltage DV to the voltage delivered to input 307. The value of DV is considered as constant.

An input of circuit 311 is coupled, preferably connected, to an output of a selection element 308, for example, a multiplexer. Thus, input 307 of comparator 306 is coupled to an output of selection element 308 via circuit 311. Input 309 of comparator 306 is coupled, preferably connected, to another output of selection element 308.

Selection element 308 is preferably a selection element or multiplexer comprising three inputs 312, 314, 316.

Input 312 receives a voltage ramp RP. Thus, circuit 17 comprises a ramp generator 304 configured to deliver voltage ramp RP. An output of generator 304 is also coupled, preferably connected, to input 312. Voltage RP is referenced to set point voltage GND. Generator 304 is powered with potential Vbat and is connected between rails 3 and 5, which connections are not shown in FIG. 4 to avoid overloading the drawing.

Each voltage ramp RP is for example a ramp increasing, preferably, from reference potential GND.

Generator 304 is controlled by circuit 300, via a signal cmdP. More particularly, when signal START is in its first state, circuit 300 controls the setting to the on state of transistor 9 and, at the same time, the starting of a voltage ramp RP via signal cmdP. As an example, signal cmdP is determined from the control signal supplied by circuit 300 to transistor 9, or even is identical to the control signal supplied by circuit 300 to transistor 9.

Input 314 receives a voltage ramp RN. Thus, circuit 17 comprises a ramp generator 310 configured to deliver voltage ramp RN. An output of generator 310 is also coupled, preferably connected, to input 314. Voltage RN is referenced to set point voltage GND. Generator 310 is powered with potential Vbat and is connected between rails 3 and 5, which connections are not shown in FIG. 4 to avoid overloading the drawing.

Each voltage ramp RN is for example a ramp decreasing, preferably, from power supply voltage Vbat. Ramps RN and RP have slopes of opposite signs. Thus, one, here slope RP, is increasing and the other, here slope RN, is decreasing. Ramps RP and RN have, in absolute value, equal slopes.

Input 316 is coupled, preferably connected, to node 171. Thus, input 316 receives set point voltage Vref.

Selection element 308 further comprises an input 318 on which the selection element receives a control signal SEL. Input 318 is preferably coupled, preferably connected, to circuit 300. Circuit 300 thus supplies control signal SEL. According to the state of signal SEL, selection element 308 delivers one of the three voltages RN, RP, and Vref on each of its outputs. Preferably, signal SEL is a binary signal and comprises two states. When signal SEL is in a first state, selection element 308 delivers on an output, preferably, the output coupled to input 307 of comparator 306, voltage RP and on the other output, preferably the output coupled to input 309 of comparator 306, set point voltage Vref. When signal SEL is in a second state, selection element 308 delivers on an output, preferably the output coupled to the input 307 of comparator 306, set point voltage Vref and on the other output, preferably the output coupled to the input 309 of comparator 306, voltage RN. Thus, one of the ramps is delivered on the non-inverting input during the power storage phase and the other ramp is delivered on the inverter input during the power delivery phase.

The operation of the embodiment of FIG. 4 will be described in further detail in relation with FIG. 5.

As a variant, selection element 308 may be replaced with two selection elements, one receiving at its inputs voltage RP and set point voltage Vref and coupled at its output to input 307 by circuit 311, and the other receiving at its inputs voltage RN and set point voltage Vref and coupled at its output to input 309.

FIG. 5 is a timing diagram illustrating the operation of the embodiment of FIG. 4. More particularly, FIG. 5 shows the input signals (V) of comparator 306, the state (T1) of transistor 13, and the state (T2) of transistor 9. FIG. 5 shows an operating cycle of the voltage converter of FIG. 4.

The shown operating cycle starts at a time t60. An operating cycle comprises a single ramp RP and a single ramp RN.

At time t60, circuit 300 controls transistor 9 in such a way that transistor 9 is on. This is shown in FIG. 5 by a high value of value T2. Circuit 300 controls transistor 13 in such a way that transistor 13 is off. This is shown in FIG. 5 by a low value of value T1.

The charge storage phase in the assembly comprising inductance 15 and capacitor 16 thus starts at time t60. In other words, time period TPon starts at time t60. Thus, current IL and voltage Vout, not shown, increase from time t60.

Circuit 300 controls generator 304 to start ramp RP. Signal cmdP, preferably generated by circuit 300 thus takes, at time t60, a value corresponding to the starting, by generator 304, of a ramp RP.

Further, circuit 300 controls selection element 308 so that selection element 308 outputs ramp RP and set point voltage Vref. Control signal SEL, preferably generated by circuit 300, thus takes a value corresponding to the presence, on the outputs of selection element 308, of ramp RP and of set point voltage Vref. Preferably, ramp RP is delivered on the output of selection element 308 coupled to input 307 by circuit 311, and set point Vref is delivered on the output of the selection element coupled to node 309.

Comparator 306 thus receives at its inputs set point voltage Vref and a voltage RP offset by circuit 311 to represent the offset of comparator 306. Thus, the output signal COMP of comparator 306 corresponds to the result of the comparison of set point voltage Vref and of voltage ramp RP+DV.

At time t60, ramp RP starts increasing, preferably from zero. Ramp RP is smaller, at time t60, than set point voltage Vref. Output signal COMP thus has the first value.

In FIG. 5, voltage ramp RP, generated by generator 304 and delivered to the input of circuit 311, is represented by a curve 20 in dotted lines. A ramp 22 in full line corresponds to the ramp output by circuit 311, that is, the ramp offset to represent the offset of comparator 306. In this example, offset DV, introduced by circuit 311, is negative. The comparator thus compares the voltage represented by curve 22 with value Vref.

At a time t62, subsequent to time t60, the voltage represented by curve 22 reaches value Vref. After a time period De, corresponding to the propagation delay of comparator 306, the output signal COMP of comparator 306 takes its second value. In other words, at a time t63, separated from time t62 by time period De, the output of comparator 306 indicates that ramp RP has reached value Vref.

As a response to the change of value of signal COMP, circuit 300 controls transistor 9 in such a way that transistor 9 is off. This is shown in FIG. 5 by a low value of value T2. Circuit 300 controls transistor 13 in such a way that transistor 13 is on. This is shown in FIG. 5 by a high value of value T1.

The phase of charge storage in the assembly comprising inductance 15 and capacitor 16 is over at time t63. The charge delivery by the assembly comprising inductance 15 and capacitor 16 starts. In other words, time period TPon is over at time t63, and time period TNon starts. Thus, current IL, not shown, decreases from time t63.

Further, circuit 300 controls generator 310 to start generating ramp RN. Signal cmdN, preferably generated by circuit 300, thus takes a value corresponding to the starting, by generator 310, of a ramp RN.

Further, circuit 300 controls selection element 308 so that selection element 308 outputs ramp RN and set point voltage Vref. Control signal SEL, preferably generated by circuit 300, thus takes a value corresponding to the presence, on the output of selection element 308, of ramp RN and of set point voltage Vref. Preferably, the set point voltage is delivered on the output of selection element 308 coupled to input 307 by circuit 311, and ramp RN is delivered on the output of the selection element coupled to node 309.

Comparator 306 thus receives at its inputs ramp RN and set point voltage Vref modified by circuit 311 to represent the offset of comparator 306. Thus, the output signal COMP of comparator 306 corresponds to the result of the comparison of set point voltage Vref+DV and of voltage ramp RN.

At time t63, ramp RN starts decreasing, preferably from value Vbat. Ramp RN is greater, at time t63, than set point voltage Vref. Output signal COMP thus recovers the first value.

In FIG. 5, set point voltage Vref, supplied to the input of circuit 311, is shown by a curve 24 in dotted lines. A curve 26 in full line corresponds to the set point voltage Vref delivered at the output of circuit 311, that is, voltage Vref offset to represent the offset of comparator 306. In this example, the offset DV introduced by circuit 311, is negative. The comparator thus compares the voltage represented by curve 26 with ramp RN.

At a time t64, subsequent to time t63, curve RN reaches the voltage represented by curve 26. After a time period De, corresponding to the propagation delay of comparator 306, the output signal COMP of comparator 306 takes its second value. In other words, at a time t66, separated from time t64 by time period De, the output of comparator 306 indicates that ramp RN has reached value Vref+DV.

Time t66 corresponds to the end of the operating cycle shown in FIG. 5 and for example to the beginning of the next operating cycle, not shown. Time t66 thus corresponds to the end of the charge delivery phase and the beginning of a charge storage phase of the next cycle.

Thus, in the same way as at time t60, circuit 300 controls:
generator 304 to start delivering a new ramp RP;
selection element 308 to output ramp RP and set point voltage Vref, preferably ramp RP being delivered on the output of selection element 308 coupled to input 307, and set point voltage Vref being delivered on the output of the selection element coupled to node 309;
transistors 9 and 13 so that they are respectively on and off.

Each of control signals cmdN and cmdP is for example equal to one of the control signals of transistors 9 and 13. Indeed, the state changes of the different control signals are performed at the same times.

Ideally, current Ires, that is, the current IL at the end of the operating cycle, is equal to zero. However, in practice, current Ires is seldom equal to zero. The described embodiment has the advantage of allowing a value IL close to zero.

It could have been chosen to use two comparators, a first comparator comparing ramp RP and set point voltage Vref and a second comparator comparing ramp RN and set point voltage Vref. The first and second comparators would have different offsets, caused by manufacturing disparities. Thus, the first and second would respectively have offsets DV1 and DV2. However, the impact of the offset and of the propagation delay would then be more significant than in the case of the previously-described embodiments. Current Ires would then be more distant from zero.

The influence of the comparator offsets is first considered. It is thus theoretically considered that the comparators do not have propagation delays. The value of current Ires, that is, the current IL at the end of the operating cycle is thus equal to:

$$Ires = (DIrise*TPon) + (DIfall*TNon) \quad [\text{Math 1}]$$

where DIrise is the slope of current IL during the storage phase, DIfall is the slope of the current during the delivery phase.

The slope of current IL during the storage phase is obtained by the following equation:

$$DIrise = \frac{Vbat - Vref}{L} \quad [\text{Math 2}]$$

where L is the inductance of inductive element 15.

The slope of current IL during the delivery phase is obtained by the following equation:

$$DIfall = \frac{-Vref}{L} \quad [\text{Math 3}]$$

where L is the inductance of inductive element 15.

In the case where the converter comprises the first and second comparators, time period TPon would be defined by the following equation:

$$TPon = \frac{R*C}{Vbat - Vref} * (Vref + DV1) \quad [\text{Math 4}]$$

where R and C respectively are a resistance value and a capacitance value, and are characteristics of generators 304 and 310.

Similarly, time period TNon would then be defined by the following equation:

$$TNon = \frac{R*C}{Vbat - Vref} * (Vbat - (Vref + DV2)) \quad [\text{Math 5}]$$

In the described embodiments, values DV1 and DV2 are respectively replaced with the absolute value of D, noted |DV|, of comparator 306, and value −|DV|, that is, a negative value having an absolute value equal to the absolute value of DV. Indeed, the same comparator is used for both phases. Further, ramp RP is delivered on the non-inverting input and ramp RN is delivered on the inverting input.

It is for example considered that values DV1 and DV2 are sufficiently close to be considered as equal, as an approximation. Thus, current Ires would be, in the case of the first and second comparators, equal to:

$$Ires = \frac{R*C}{L} DV \left(1 + \frac{Vref}{Vbat - Vref}\right) \quad [\text{Math 6}]$$

Further, current Ires, in the described embodiment, is equal to:

$$Ires = \frac{R*C}{L} DV \left(1 - \frac{Vref}{Vbat - Vref}\right) \quad [\text{Math 7}]$$

Thus, value Ires is always closer to zero in the described embodiment than in the case of the first and second comparators.

The influence of the propagation delays is first considered. It is thus theoretically considered that the comparators have no offset.

In the case of the first and second comparators, the first comparator has a propagation delay De1 and the second comparator has a propagation delay De2. The value of current Ires, that is, the current IL at the end of the operating cycle is thus equal to:

$$Ires = (DIrise*(TPon+De1)) + (DIfall*(TNon+De2)) \quad [\text{Math 8}]$$

where DIrise, DIfall, TPon, and TNon have the same values as previously, with DV1=DV2=DV=0.

In the previously-described embodiments, the value of current Ires, that is, the current IL at the end of the operating cycle is thus equal to:

$$Ires = (DIrise*(TPon+De)) + (DIfall*(TNon+De)) \quad [\text{Math 9}]$$

where DIrise, DIfall, TPon, and TNon have the same values as previously, with DV1=DV2=DV=0.

Thus, current Ires would be, in the case of the first and second comparators, equal to:

$$Ires = \frac{1}{L}((Vbat - Vref)*De1 - Vref*De2) \quad \text{[Math 10]}$$

Current Ires, in the case of the described embodiments, is equal to:

$$Ires = \frac{De}{L}(Vbat - 2Vref) \quad \text{[Math 11]}$$

If De1 is different from De2, which is almost always true, current Ires in the case of the embodiments is closer to zero than in the case of the first and second comparators.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereinabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A voltage converter comprising:
a first transistor connected between a first node of the converter and a second node configured to receive a power supply voltage;
a second transistor connected between the first node and a third node configured to receive a reference potential; and
a first circuit configured to control the first and second transistors, the first circuit comprising:
a selection circuit;
a comparator comprising first and second inputs, wherein the first input is configured to receive, during a first phase, a first voltage ramp from the selection circuit and, during a second phase, a set point voltage from the selection circuit, and wherein the second input is configured to receive, during the first phase, the set point voltage from the selection circuit and, during the second phase, a second voltage ramp from the selection circuit; and
a state machine coupled to a control terminal of the first transistor and a control terminal of the second transistor, wherein the state machine is configured to receive input from the comparator and to provide a control signal to the selection circuit.

2. The converter according to claim 1, wherein the first input is a non-inverting input and the second input is an inverting input.

3. The converter according to claim 1, wherein the first and second inputs are respectively coupled to first and second outputs of the selection circuit, the selection circuit receiving as inputs the set point voltage and the first and second voltage ramps.

4. The converter according to claim 3, wherein the selection circuit comprises a multiplexer.

5. The converter according to claim 1, further comprising an operating mode comprising a plurality of operating cycles, each operating cycle comprising the first phase and the second phase.

6. The converter according to claim 1, wherein the first voltage ramp is a rising ramp and the second voltage ramp is a falling ramp.

7. The converter according to claim 1, wherein the first and second voltage ramps have a same slope, in absolute value.

8. The converter according to claim 1, wherein the first circuit is configured to maintain the first and second transistors respectively on and off during the first phase, and to maintain the first and second transistors respectively off and on in the second phase.

9. The converter according to claim 1, further comprising:
an inductive element coupled between the first node and an output node of the converter; and
a capacitive element coupled between the output node and the third node.

10. A method of controlling a voltage converter, the voltage converter comprising a first transistor connected between a first node of the converter and a second node, a second transistor connected between the first node and a third node, a comparator comprising first and second inputs, and a selection circuit coupled to the first and second inputs, the selection circuit comprising three inputs, the method comprising:
receiving, at the second node, a power supply voltage;
receiving, at the third node, a reference potential;
controlling, by a first circuit, the first and second transistors;
receiving, from the selection circuit through the first input during a first phase, a first voltage ramp;
receiving, from the selection circuit through the second input during the first phase, a set point voltage;
receiving, from the selection circuit through the first input during a second phase, the set point voltage; and
receiving, from the selection circuit through the second input during the second phase, a second voltage ramp.

11. The method according to claim 10, further comprising:
non-inverting, by the first input, the first voltage ramp; and
inverting, by the second input, the set point voltage.

12. The method according to claim 10, further comprising:
selectively providing, to the first input, one of the set point voltage, the first voltage ramp, or the second voltage ramp; and
selectively providing, to the second input, one of the set point voltage, the first voltage ramp, or the second voltage ramp.

13. The method according to claim 10, further comprising an operating mode comprising a plurality of operating cycles, each operating cycle comprising the first phase and the second phase.

14. The method according to claim 10, wherein the first voltage ramp is a rising ramp and the second voltage ramp is a falling ramp.

15. The method according to claim 10, wherein the first and second voltage ramps have a same slope, in absolute value.

16. The method according to claim 10, further comprising providing, to the first circuit, an output signal from the comparator.

17. The method according to claim 16, further comprising:
the output signal taking a first value in response to the second voltage ramp reaching a value of the set point voltage; and
the output signal taking a second value in response to the first voltage ramp reaches the value of the set point voltage.

18. The method according to claim 10, further comprising:
maintaining, by the first circuit, the first and second transistors respectively on and off during the first phase; and
maintaining, by the first circuit, the first and second transistors respectively off and on in the second phase.

19. The method according to claim 10, further comprising:
providing, by a second comparator, a start signal to the first circuit in response to an output voltage of the converter being smaller than the set point voltage.

20. The method according to claim 10, wherein the selection circuit comprises a multiplexer.

21. A voltage converter comprising:
a first transistor connected between a first node of the converter and a second node configured to receive a power supply voltage;
a second transistor connected between the first node and a third node configured to receive a reference potential;
a multiplexer receiving as input a first voltage ramp, a second voltage ramp, and a set point voltage;
a comparator comprising first and second inputs, wherein the first input is configured to receive, during a first phase, the first voltage ramp from the multiplexer and, during a second phase, the set point voltage from the multiplexer, and wherein the second input is configured to receive, during the first phase, the set point voltage from the multiplexer and, during the second phase, the second voltage ramp from the multiplexer; and
a state machine coupled to a control terminal of the first transistor and a control terminal of the second transistor, wherein the state machine is configured to receive input from the comparator and to provide a control signal to the multiplexer.

22. The converter according to claim 21, wherein the comparator is configured to output an output signal, the output signal taking a first value when the second voltage ramp reaches a value of the set point voltage, and taking a second value when the first voltage ramp reaches the value of the set point voltage.

* * * * *